United States Patent [19]

Jobe

[11] Patent Number: 5,020,810
[45] Date of Patent: Jun. 4, 1991

[54] LIQUID SIGHT MONITOR WITH MULTI-CONTACT INSERT

[75] Inventor: Benjamin L. Jobe, Houston, Tex.

[73] Assignee: Jogler, Inc., Houston, Tex.

[21] Appl. No.: 344,951

[22] Filed: Apr. 21, 1989

Related U.S. Application Data

[63] Continuation-in-part of Ser. No. 274,743, Nov. 14, 1988, which is a continuation of Ser. No. 140,880, Jan. 6, 1988, abandoned, which is a continuation of Ser. No. 785,782, Oct. 9, 1985, abandoned.

[51] Int. Cl.$^5$ .................................................. F16J 15/10
[52] U.S. Cl. ................................. 277/207 A; 277/210; 285/110; 285/133.1
[58] Field of Search ............... 277/207 R, 207 A, 208, 277/209, 210; 285/133.1, 110; 75/323, 328

[56] References Cited

U.S. PATENT DOCUMENTS

| 631,661 | 8/1899 | Perry | 73/328 |
|---|---|---|---|
| 2,629,262 | 2/1953 | Vilter | 73/326 |
| 3,363,912 | 1/1968 | Holloway | 277/207 A X |
| 3,702,193 | 11/1972 | Flegel et al. | 277/207 A |
| 3,913,928 | 10/1975 | Yamaguchi | 277/209 |
| 3,998,471 | 12/1976 | Zopfi | 277/207 A X |
| 4,111,466 | 9/1978 | Deregibus | 285/133.1 |
| 4,293,138 | 10/1981 | Swantee | 277/207 A |
| 4,343,480 | 8/1982 | Vassallo | 285/110 |
| 4,345,468 | 8/1982 | Jackson | 73/326 |
| 4,423,526 | 1/1984 | Izzi | 277/207 A |
| 4,426,095 | 1/1984 | Buttner | 277/207 A |
| 4,429,886 | 2/1984 | Buttner | 277/207 A |
| 4,440,406 | 4/1984 | Erickson | 277/207 A |
| 4,478,436 | 10/1984 | Hashimoto | 277/207 A |

FOREIGN PATENT DOCUMENTS 1565530  4/1980  United Kingdom .

Primary Examiner—William A. Cuchlinkski, Jr.
Assistant Examiner—Scott Cummings
Attorney, Agent, or Firm—Vaden, Eickenroht, Thompson & Boulware

[57] ABSTRACT

A tubular connector, such as used with a liquid sight monitor, having a plurality of internal deformable ridges for bearing against the external surface of the tube of the monitor. Hence, it accommodates to a range of sizes and irregular tube shapes. The connector is made of a material that in a thick dimension is not deformable, but in a small dimension is deformable, such is Teflon FEP. The body is thick enough to be rigid, whereas the ridges are complaint, more so in a direction toward the mounting end of the connector or end of the tube. Pressure leakage form the liquid system to which the sight monitor is attached increases the pressure seal of the ridges with respect to the surface of the tube. Concentric tube sight monitors are connected to their systems using a connector having, in addition to the set of ridges for accommodating to the internal tube in the manner just described, a second set of ridges for conforming to an external tube. This second set of ridges can be either outwardly directed or inwardly directed from a concentric slot in the connector and into which the end of the concentric tube is inserted. Other embodiments are also described.

2 Claims, 3 Drawing Sheets

FIG.8
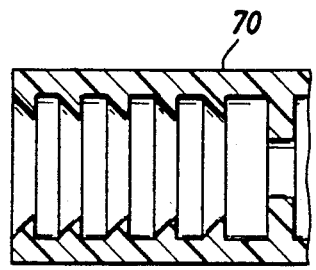
FIG.9
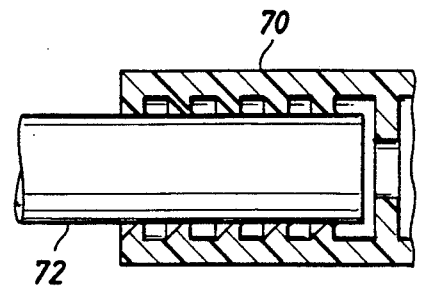
FIG.10
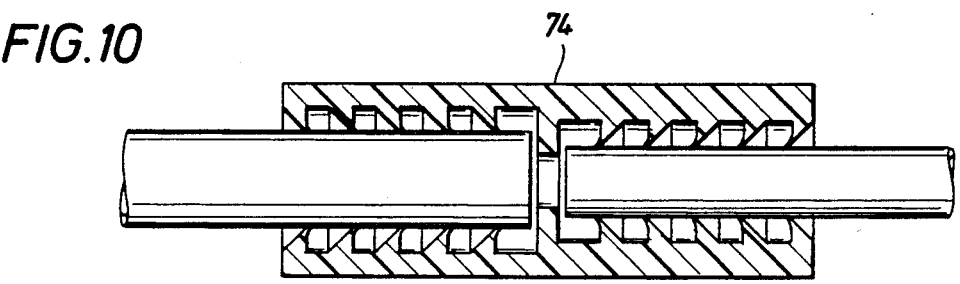
FIG.11
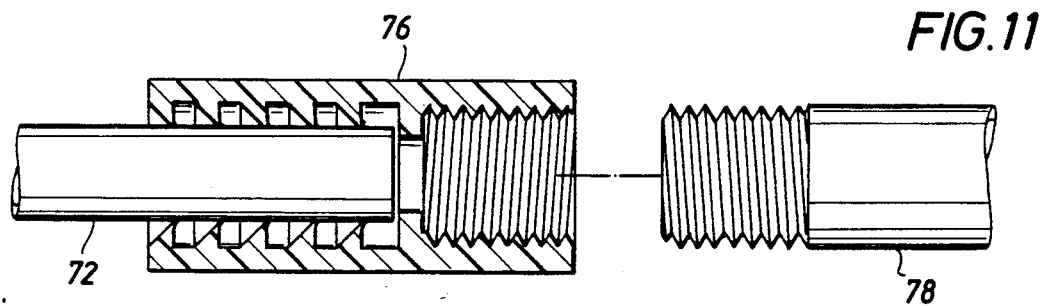
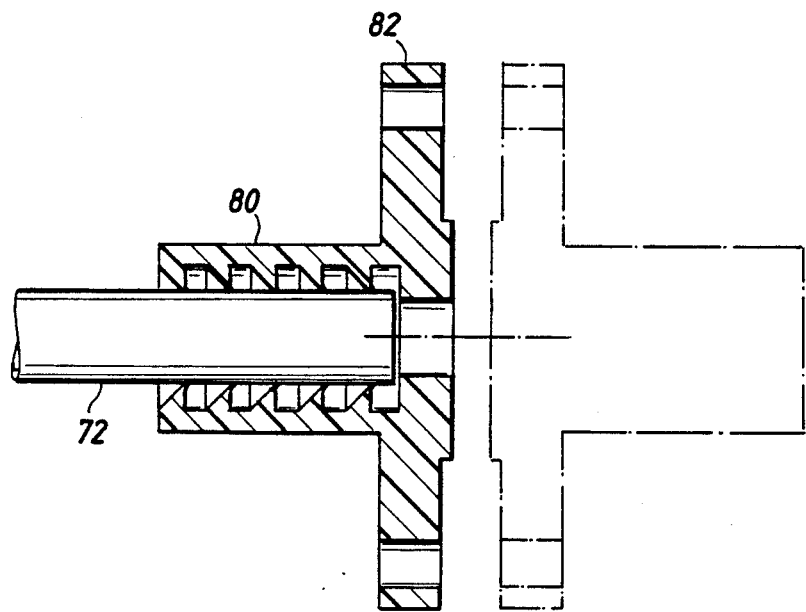
FIG.12

LIQUID SIGHT MONITOR WITH MULTI-CONTACT INSERT

This application is a continuation-in-part of Ser. No. 07/274,743, filed Nov. 14, 1988, which was a continuation of application Ser. No. 07/140,880, filed Jan. 6, 1988, now abandoned, which was a continuation of application Ser. No. 06/785,782, filed Oct. 9, 1985, now abandoned.

BACKGROUND OF THE INVENTION

1. Field of the Invention

This invention pertains to connections of tubular products, such as for example liquid sight monitors and more particularly to how such products are connected in either a liquid flowing system or as a level gauge with respect to a liquid storage system.

2. Description of the Prior Art

As an example of tubular products that can be joined or connected in the manner hereinafter described, liquid sight monitors primarily include both sight flow indicators and liquid level gauges. A sight flow indicator is employed in a flowing liquid system, or in a bypass connection to such a system, to show that fluid is flowing and in some cases to show if a condition has changed, such as the liquid changing color. A liquid level gauge is employed to monitor the level of liquid stored in an opaque tank or other similar vessel. Usually, one or more gauges are connected to vertically separated piping from the vessel to give a visual indication of the level of the liquid within the vessel.

The monitor employs a transparent element, usually glass, to permit visual observance of the liquid. It should be further noted that the liquid is often under pressurized condition and frequently the vessel is part of a vehicle, such as a tank on a tank car. In many of such applications, one or both ends of the sight monitor is mounted in a severely difficult installation environment, where the sight monitor might work loose. It could be very inconvenient or very dangerous if such event occurred.

Prior art connections include the tubing adapter shown in U.S. Pat. No. 3,381,976. Such an adapter has a plurality of pressure energized O-ring seals operating with accommodating grooves, the ring seals bearing against the surface of the glass. Such a connector forms satisfactory connection provided the glass is not appreciably out-of-round and there is not a great deal of internal pressure operating on the glass in such a way that the glass is vertically pressured out of the connector.

Sight monitors are not always simple one-glass devices. They are sometimes made of two concentric glass tubes, the outer tube providing means to environmentally isolate or protect the inner tube with the liquid. That is, in a concentric tube installation, the volume between the tubes can be purged of moisture and air or can be replaced with an inert gas. Such a sight monitor does not fog up like a single glass device might. Furthermore, protective shields, such as tubular metallic shields with one or more slot openings, can be provided to keep the glass tube or tubes from being broken.

U.S. Pat. No. 4,345,468 entitled "Liquid Sight Monitor", issuing Aug. 24, 1982 in the name of William A. Jackson, and commonly assigned herewith, discloses the use of connector ends having O-ring seals in appropriate grooves so as to permit O-ring sealing against an internal tube and O-ring sealing against an outer tube. The disclosure set forth in U.S. Pat. No. 4,345,468 is adopted herein by reference for all purposes.

Again, however, if the dimensions of the tubes are not held within close tolerance, or if they are out-of-round of if the connector portion with the O-ring grooves is not perfectly dimensioned, then there is danger of a loose seal. No provisions are provided to adjust the seal in the presence of an improperly sized tube or connector component or in the presence of pressure being exerted to separate the connector from the tube or tubes it holds. Moreover, such a structure requires the resilient O-rings to have separate, non-resilient support structure apart from the O-rings themselves to provide stabilizing support of the O-rings in their places, which structures in the '468 patent are the connector ends and the splicer connector having grooves therein for accommodating and constraining the O-rings so that they are able to correctly function.

Therefore, it is a feature of the present invention to provide an improved one piece connector for a tubular product such as a sight flow monitor that is secured at least at one end in such a way so as to accommodate to a limited range of sizes and out-of-round conditions of a tube.

It is another feature of the present invention to provide an improved connector that pressure seals against the end of a liquid sight monitor, particularly when the liquid system being monitored is under pressure.

It is still another feature of the present invention to provide an improved connector that pressure seals against both tubes of a concentric tube liquid sight monitor, particularly when the liquid system being monitored is under pressure.

SUMMARY OF THE INVENTION

In a preferred embodiment of the invention, a liquid sight monitor is connected to a liquid system employing a generally tubular connector made from a fluoroplastic material, such as TFE, PFA or FEP Teflon. Such connector is sized to have a wall dimension of about one-quarter inch, thereby making the overall general structural virtually rigid and non-deformable. However, the internal opening of the connector includes a plurality of inwardly directed ridges for bearing against the surface of the glass or other transparent tube of the monitor. These ridges taper to a small dimension and, in contrast to the wall structure, are deformable. The ridges are preferably sloped on the side away from the end of the tube and have preferably a radial side toward the tube end. Hence, when the tube is inserted into the connector, the ridges are deformably bent over in a direction toward the tube end. Pressure leakage around the end will cause the connector ridges to pressure seal against the surface of the tube to an even greater degree than provided by the resiliency of the material of the ridges.

A connector for a concentric tube liquid sight monitor includes a second set of ridges of the type just described. The ridges in one embodiment of the tubular connector are along the external surface for bearing outwardly against the internal surface of the outer concentric tube. Alternatively, in another embodiment, a concentric axial slot in the tubular connector includes a second set of inwardly directed ridges for bearing against the external surface of the outer concentric tube.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the appended drawings, which drawings form a part of this specification. It is to be noted, however, that the appended drawings illustrate only preferred embodiments of the invention and are therefore not to be considered limiting of its scope for the invention may admit to other equally effective embodiments.

IN THE DRAWINGS

Figure 1:
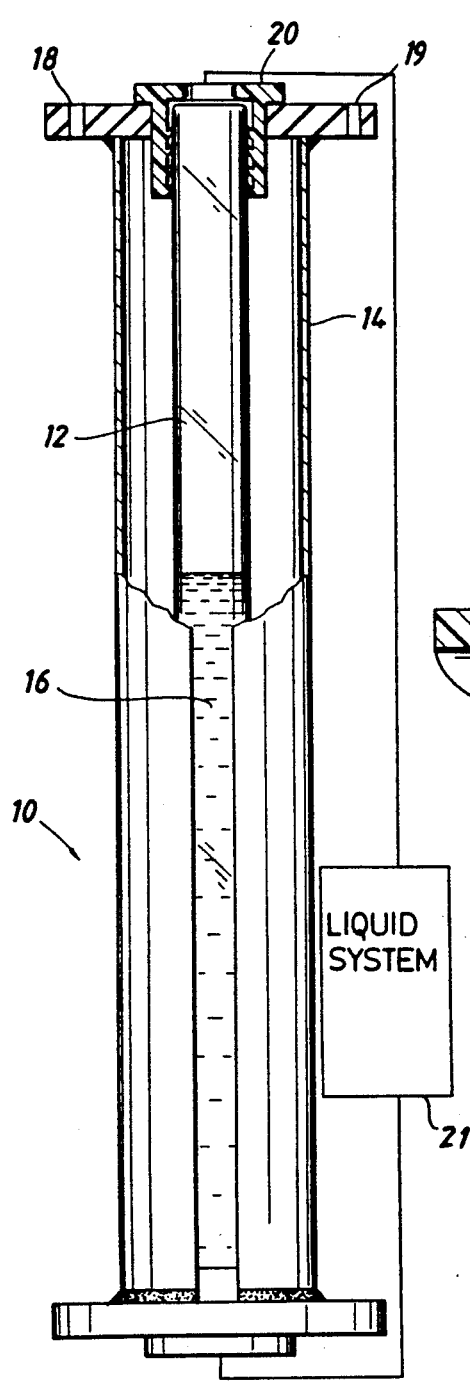

FIG. 1 is a side view, partly cutaway, of a standard liquid level gauge in accordance with the present invention.

Figure 2:
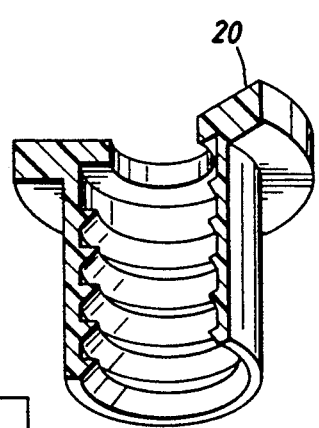

FIG. 2 is a perspective view of a connector in accordance with the present invention, the view being partly cutaway to show the internal ridges thereof.

Figure 3:
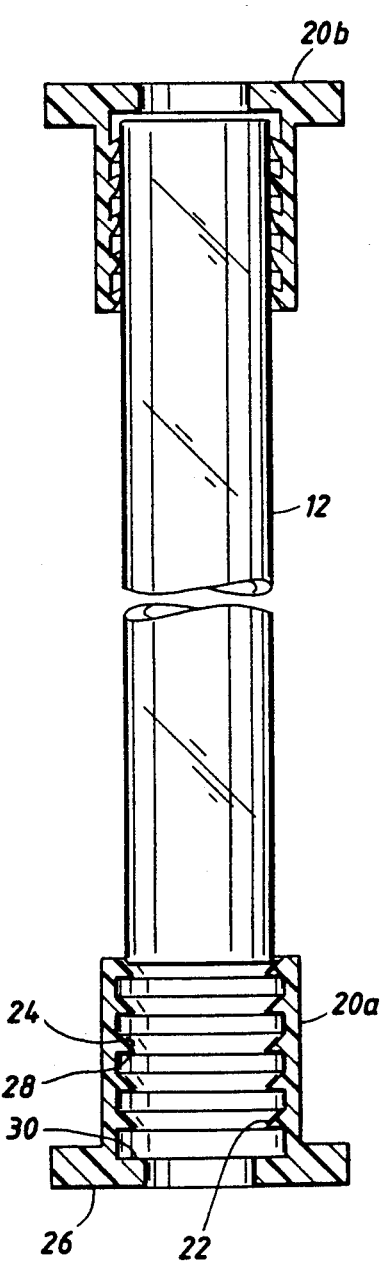

FIG. 3 is a cross-sectional view of a preferred embodiment of the present invention showing a connector both prior and after installation on an accommodating tube in a liquid sight monitor.

Figure 4:
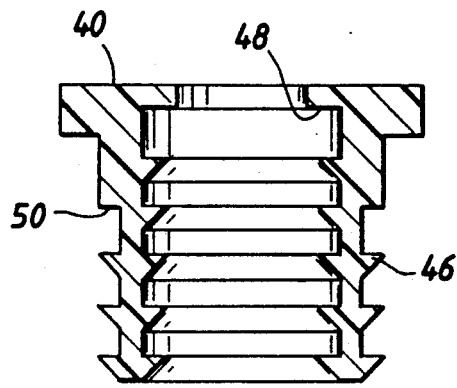

FIG. 4 is a cross-sectional view of a preferred embodiment of a connector end used with a liquid sight monitor employing concentric tubes.

Figure 5:
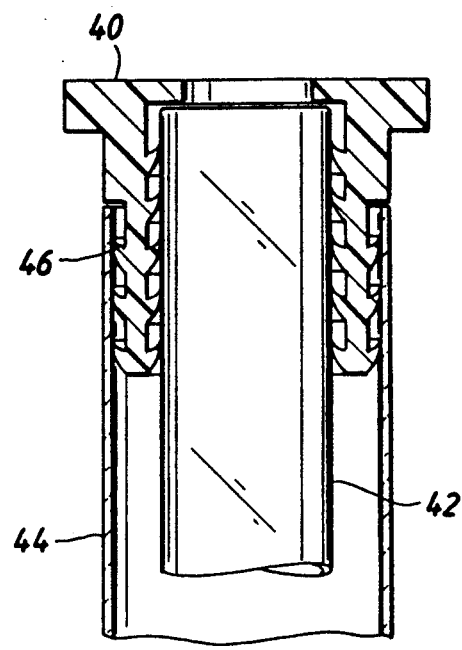

FIG. 5 shows the connector shown in FIG. 4 after it has been installed on the end of accommodating concentric tubes.

Figure 6:
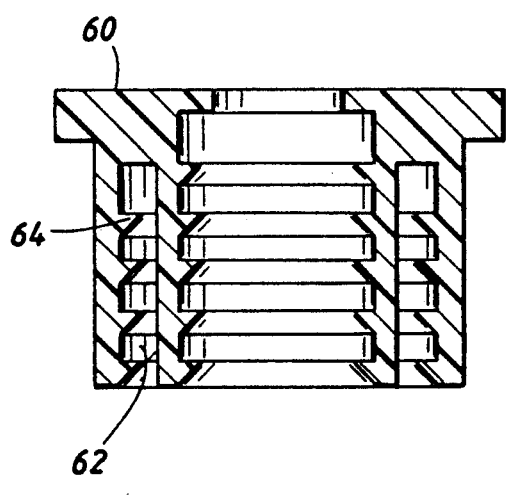

FIG. 6 is a cross-sectional view of an alternate connector for use with a concentric tube liquid sight monitor.

Figure 7:
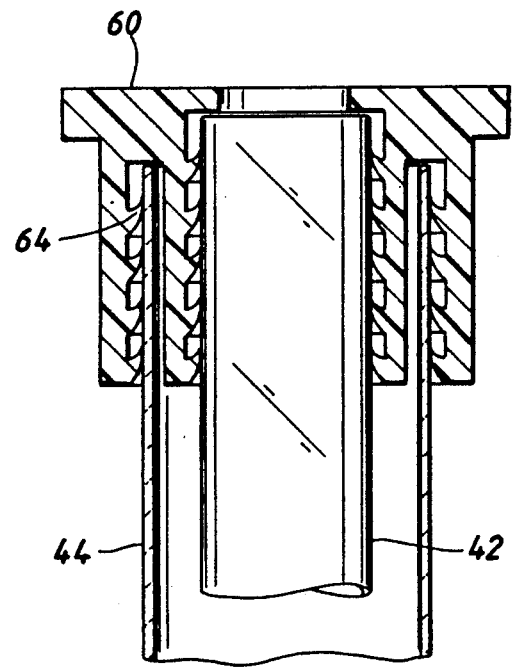

FIG. 7 is a cross-sectional view of the connector shown in FIG. 6 installed on the ends of the concentric tubes of the concentric tube liquid sight monitor.

FIG. 8 is a cross-sectional view of a generic connector end of a basic connector for receiving a tubular member.

FIG. 9 is a cross-sectional view of the connector end shown in FIG. 8 receiving a tubular member.

FIG. 10 is a cross-sectional view of a suitable splicer connector for connecting two tubular members of different external diameters.

FIG. 11 is a cross-sectional view of a suitable partially threaded connector for joining a non-threaded tubular member to an adjoining system wherein the joining member of the system is a threaded tubular member.

FIG. 12 is a cross-sectional view of a suitable flange connector for joining a tubular member to an adjoining system wherein the joining member of the system includes a flange.

DESCRIPTION OF THE PREFERRED EMBODIMENTS

Now referring to the drawings and first to FIG. 1, a standard liquid level gauge 10 is shown. This is one of two types of liquid sight monitors. The other type is a sight flow indicator. Basically, the parts of the gauge shown in FIG. 1 include a high pressure glass tube 12, which could in a particular installation, be another type of transparent material. At least partly surrounding tube 12 is shield 14, which is conveniently slotted at least on one side to permit observing liquid 16 as its level rises and falls within tube 12. Flange 18 at the top and a comparable flange at the bottom provide means for installing the gauge in its installation of use. A connector end 20, sometimes referred to as an insert, holds tube 12 in place and seals against the surface of the tube in a manner hereinafter explained. An oblique view of this connector is shown in FIG. 2, for convenience. It should be noted, however, that connector 20 includes a flange end 20b that holds connector 20 abuttingly against mounting flange 18 with the tubular end of connector 20 passing through an internal opening in flange 18, as shown. Flange 18 includes a plurality of bolt holes 19 for mounting flange 18 into its place of monitoring the liquid level of fluid system 21 to which it is attached. It should be noted that gauge 10 includes a flange 18 and a comparable flange at its opposite end for cooperating with a connector 20; however, a particular installation may install the lower end of the gauge in a different manner.

FIG. 3 shows tube 12 prior to being installed in connector 20a and following installation in connector 20b. Both connectors 20a and 20b are identical to connector 20 shown in FIGS. 1 and 2. It should be noted, however, that the components shown in FIG. 3 can be mounted independently of the shield and flange shown in FIG. 1, if desired.

Tubular connectors 20a and 20b are made of a fluoroplastic material, preferably Teflon TFE, although other materials can be employed. Other suitable materials include Teflon PFA and Teflon FEP. Teflon is a registered trademark of E. I. duPont de Nemours, Inc. Teflon FEP is a fluorocarbon copolymer made by polymerizing a mixture of tetrafluoroethylene and hexafluoropropylene. The properties of the final polymer can be varied slightly by changing the ratio of the two monomers. The connector is sized to have a wall dimension that makes the overall structure virtually non-deformable. A preferred embodiment of connector 20 has a wall dimension of about one-quarter inch.

Connector 20a includes a plurality of internally directed ridges 22 which bear against tube 12 following installation. The ridges are not uniformly dimensioned in the preferred embodiment, however. It should be noted that one side 24 away from mounting end 26 is sloped whereas the side 28 nearest end 26 is not sloped but is radial to the axis of the connector and the tube to which it attaches. An internal stop shoulder 30 is provided to limit the vertical position of inserted tube 12.

Now referring to connector 20b, which is assumed to be identical to connector 20a, tube 12 has been inserted in the tubular end of the connector. The external diameter of the tube is slightly larger than the internal diameter of ridges 22 prior to being bent over or deformed upon installation of tube 12.

During installation, the resiliency or elasticity of the material of the connector at the ridges results in them being deformed or moved aside; however, they then bear outwardly to hold and seal tube 12 firmly in place even though tube 12 might be slightly out-of-round. Furthermore, connector 20b will accommodate a range of external diameter sizes within the limit of the amount of deformity permitted by internal ridges 22.

It is not unusual for the liquid system to which the sight monitor is attached to be under at least a slight amount of pressure. Such pressure will tend to leak around the external surface of the end of tube 12. When this occurs, the pressure tends to push open the ridges of the connector and thereby causes them to pressure even harder against the external surface of tube 12. Hence, the structure achieves a pressure seal which has not been heretofore available with the O-rings included in prior art connectors.

Now referring to FIG. 4, a connector 40 is shown for connecting to a liquid sight monitor having an internal tube 42 and a concentric external tube 44. The internal surface of tubular connector 40 is substantially the same as for tubular connector 20 previously described.

Hence, as shown in FIG. 5, internal tube 42 is inserted so that its external surface bears against and deforms the internal ridges of connector 40 in a direction toward the mounting the end of the connector. In similar fashion, external tube 44 slides up the outwardly extending ridges 46 so that they deform also-in the direction toward the mounting end of connector 40 and are deformed in a direction that also bears against the internal surface of tube 44. Ridges 46 have substantially the same shape and operating characteristics as the internally directed ridges previously discussed.

It should be noted that there is an internal stop 48 for limiting the position of the internal tube 42 and an external stop or shoulder 50 for limiting the position of external tube 44 with respect to connector 40.

Now referring to FIGS. 6 and 7, an alternative embodiment of a connector 60 is disclosed for providing a connection to concentric tubes 42 and 44. Again, the internal surface of connector 60 is similar to the connectors previously described. The ridges in such surface bear against the external surface of tube 42. Included in connector 60 is a concentric annular slot 62 having an axis which is identical to the central axis of the connector. Axial slot 62 includes internally directed ridges 64 which are substantially identical in shape and operation to the ridges bearing against the external surface of tube 42 previously described. The number of ridges may be slightly less. In the embodiment shown, there are five ridges that bear against tube 42 and there are four ridges 64. As shown in FIG. 7, these inwardly directed ridges 64 bear against the external surface of tube 44.

It should also be noted that the ridges of connectors 40 and 60 operate in the same manner as the ridges of connector 20 described above in that a slight amount of pressure leakage around the ends of the respective tubes will produce pressure sealing of the ridges to tighten the connector even more than the natural resiliency of the material of the connectors.

Although the invention has been described above in connection with one or more particular connectors, the generic version of the invention is a connector end 70 with a rigid or flexless body and with inwardly directed, tapered ridges as previously described, such as shown in FIGS. 8 and 9. FIG. 8 shows such a connector end prior to use and FIG. 9 shows the connector end having received the insertion of tube 72.

FIGS. 10, 11 and 12 show additional exemplary embodiments to those described above, each having a connector end like connector end 70, described above.

For example, the connector shown in FIG. 10 is splicer connector 74, the connector having mirror images of the ridges in its opposite ends to receive tubular members from opposite directions. In the drawing, tubular members of different external diameters are shown being received in the opposite ends of the connector. Obviously, a connector of the same design having the same internal diameters at each end could be used to receive tubular members of the same external diameter.

FIG. 11 shows a connector 76 in which one end receives a non-threaded tubular member 72, as previously described, and the other end is internally threaded to receive the threaded end of tubular member 78, which is part of the system to which the connector provides connection. FIG. 12 shows a connector 80 in which one end receives a tubular member 72, as previously described, and the other end is flanged at flange 82 for attachment to a suitable mating flange of an adjoining member via appropriate bolt holes in the respective flanges.

While particular embodiments of the invention have been shown and described, it will be understood that the invention is not limited thereto since many modifications may be made and will become apparent to those skilled in the art.

What is claimed is:

1. A one-piece holding and sealing connector for connecting a fluid conducting tubular member to an adjoining fluid system, comprising
   a first end adaptable for communicatively connecting the tubular member with the system for fluid conduction therewith,
   a second end integral with said first end, said second end being generally cylindrical for surrounding the tubular member, said second end being substantially flexless, and
   a plurality of resilient ridges formed integrally of and projecting inwardly from an interior surface of said second end, said ridges bending over and bearing against the tubular member to hold the tubular member firmly in place and to provide a seal at an interface between said ridges and the tubular member.

2. A one-piece holding and sealing connector in accordance with claim 1, wherein said resilient ridges have a first side nearest said first end that is radial to the cylindrical axis of said second end and a second side that slopes away from said first side in an outwardly direction so that fluid under pressure entering a space between the tubular member and an interior surface of the holding and sealing connector from a location within the connector at the end of the tubular member will push said ridges against the tubular member, thereby providing a pressure seal and enhancing the sealing effects of said ridges.

* * * * *